(12) United States Patent
Losfeld et al.

(10) Patent No.: US 7,585,583 B2
(45) Date of Patent: Sep. 8, 2009

(54) METAL STACK FOR FUEL CELLS OR ELECTROLYSERS

(75) Inventors: Ronny Losfeld, Waregem (BE); Lieven Anaf, Waregem (BE)

(73) Assignee: NV Bekaert SA, Zwevegem (BE)

( * ) Notice: Subject to any disclaimer, the term of this patent is extended or adjusted under 35 U.S.C. 154(b) by 918 days.

(21) Appl. No.: 10/501,146

(22) PCT Filed: Dec. 19, 2002

(86) PCT No.: PCT/EP02/14531

§ 371 (c)(1),
(2), (4) Date: Jul. 13, 2004

(87) PCT Pub. No.: WO03/061042

PCT Pub. Date: Jul. 24, 2003

(65) Prior Publication Data

US 2004/0265677 A1    Dec. 30, 2004

(30) Foreign Application Priority Data

Jan. 15, 2002    (EP) .................................. 02075156

(51) Int. Cl.
H01M 2/14 (2006.01)
H01M 2/02 (2006.01)
H01M 2/08 (2006.01)
C25B 9/00 (2006.01)

(52) U.S. Cl. .............................. 429/39; 429/34; 429/35; 429/36; 429/37; 429/38; 429/44; 429/45; 429/72; 44/520; 204/277; 204/246; 204/256; 204/258; 204/265; 204/270

(58) Field of Classification Search ............. 429/34–39, 429/44, 72, 2; 44/520; 204/277, 246, 256, 204/258, 265, 270
See application file for complete search history.

(56) References Cited

U.S. PATENT DOCUMENTS

| 4,713,805 | A |   | 12/1987 | Henaff |
| 4,791,035 | A | * | 12/1988 | Reichner ...................... 429/31 |
| 5,441,822 | A | * | 8/1995 | Yamashita et al. ............ 429/34 |
| 5,482,792 | A | * | 1/1996 | Faita et al. ..................... 429/30 |
| 5,512,145 | A | * | 4/1996 | Hollenberg .................. 205/628 |
| 6,022,634 | A | * | 2/2000 | Ramunni et al. .............. 429/34 |
| 6,232,010 | B1 | * | 5/2001 | Cisar et al. .................... 429/40 |
| 6,613,468 | B2 | * | 9/2003 | Simpkins et al. .............. 429/34 |

FOREIGN PATENT DOCUMENTS

| EP |   | 0 141 241 B1 | 5/1985 |
| WO | WO 00/69003 A2 | 11/2000 |

OTHER PUBLICATIONS

Winter, Mark, Chemistry:Periodic Table:nickel:physical properties, Mar. 11, 2008, http://webelements.com.*

* cited by examiner

*Primary Examiner*—Dah-Wei D Yuan
*Assistant Examiner*—Kwang Han
(74) *Attorney, Agent, or Firm*—Foley & Lardner LLP

(57) ABSTRACT

A stack, to be used in a fuel cell or electrolyzer, includes a collector layer, at least one diffusion layer and at least one anchoring layer. The collector layer being a metal foil or metal plate or foamed metal sheet, the diffusion layer can be a metal mesh or expanded metal sheet. An anchoring layer having a thickness of less than 0.5 mm can include metal fibers and be sintered between the collector layer and the diffusion layer.

21 Claims, 3 Drawing Sheets

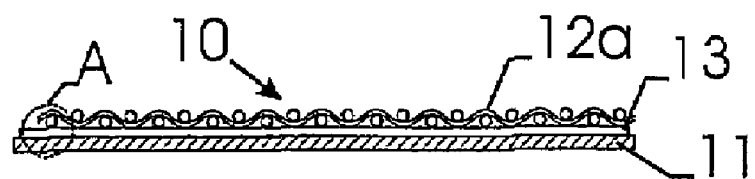
Fig. 1a
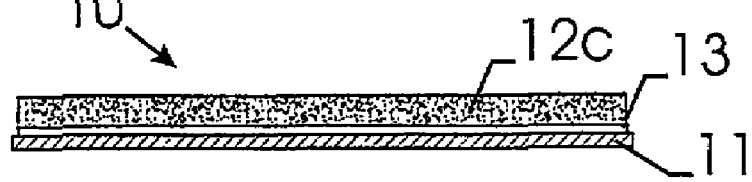
Fig. 1b
Fig. 1c
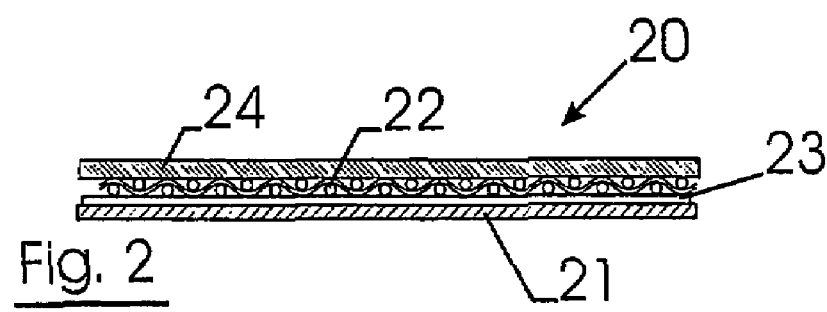
Fig. 2
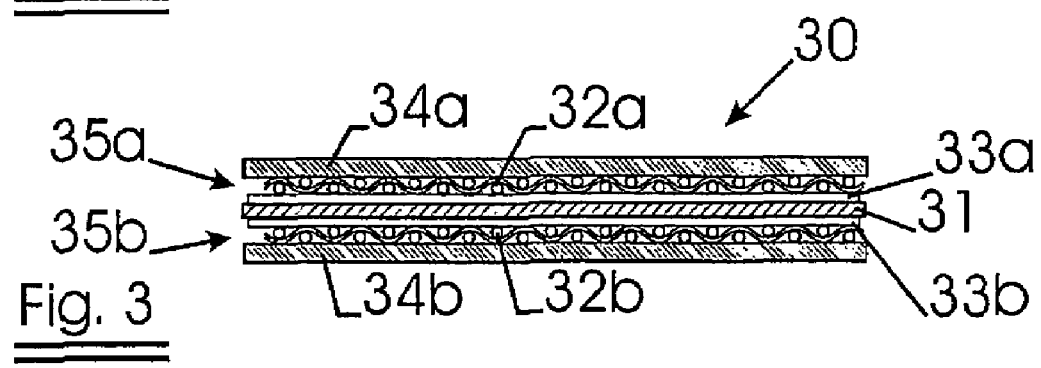
Fig. 3
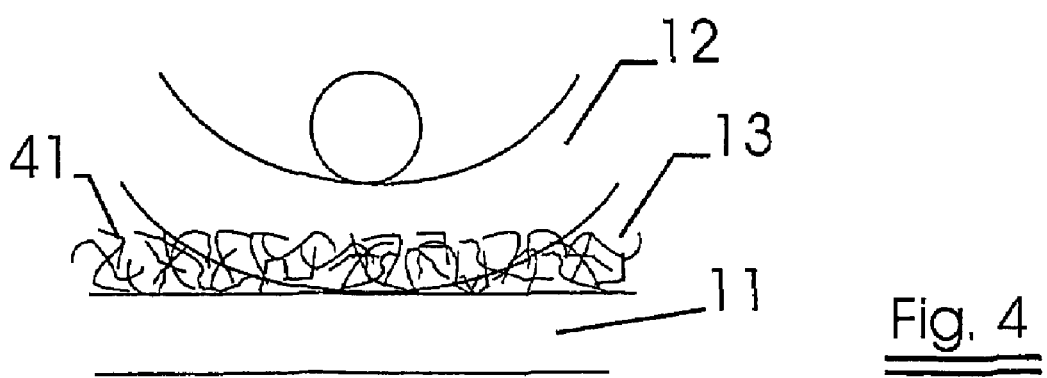
Fig. 4

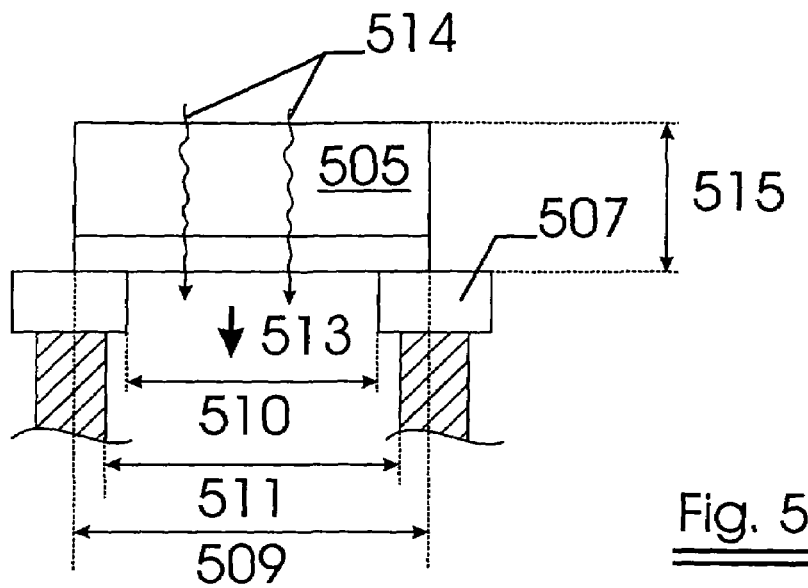
Fig. 5c
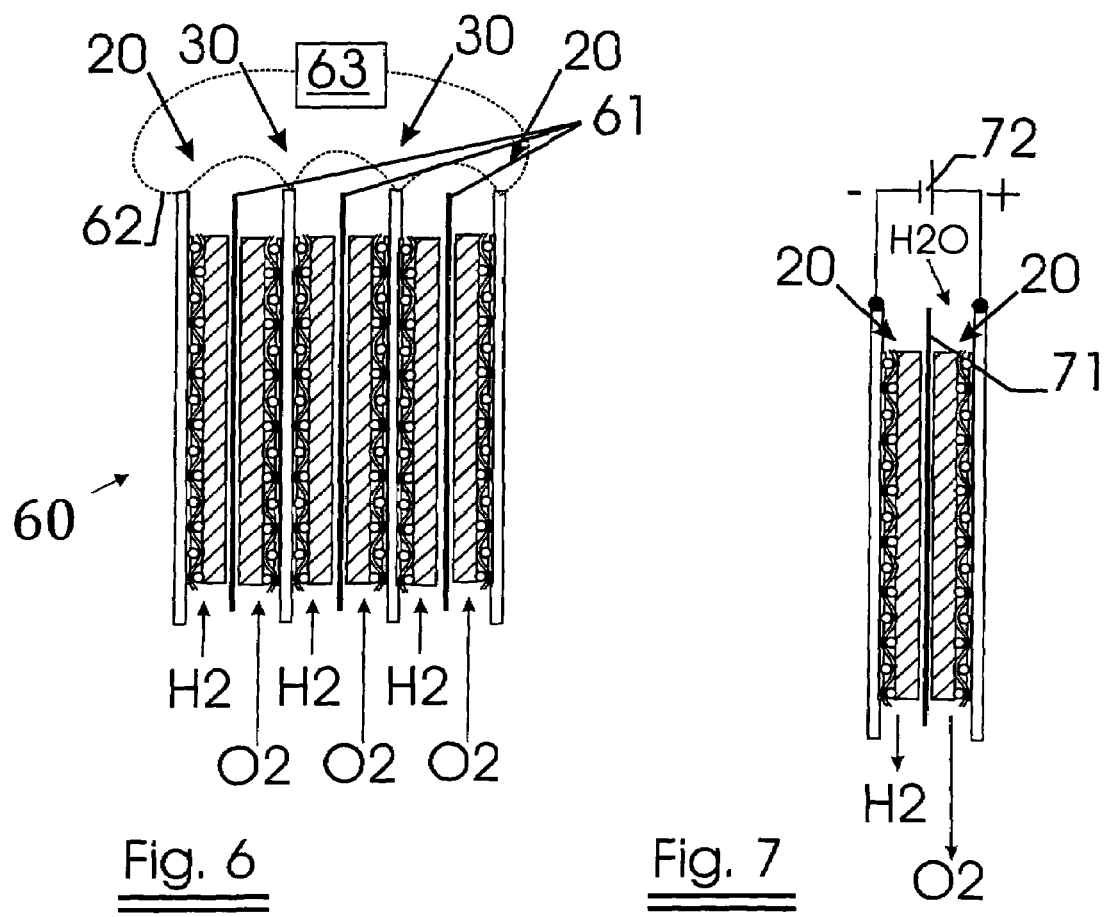
Fig. 6
Fig. 7

METAL STACK FOR FUEL CELLS OR ELECTROLYSERS

FIELD OF THE INVENTION

The present invention relates to a porous stack comprising metal mesh and/or expanded metal sheet or foil and/or a sheet of foamed metal, to be used in fuel cells or electrolysers.

BACKGROUND OF THE INVENTION

Fuel cells and electrolysers usually comprise a number of stacks, which are added in combination with a proton exchange membrane (PEM), in order to obtain separated cells for the electrochemical reactions in either the fuel cell or electrolyser. Such stacks are generally known in the art. They usually have at least 3 layers, engaging each other closely.

A first layer is a water- and gas-proof layer, hereafter referred to as "collector layer", and also referred to in the art as "bipolar plate". This collector layer avoids gas or water leakage from one cell to an other, and guides electrons (e−) to or from the cell. Therefore it is generally known to use a conductive plate, usually a graphite plate.

A second layer, engaging closely one side of the collector layer, is used to distribute the gasses, used or provided by the electrochemical reaction in the fuel cell or electrolyser at the proton exchange membrane (PEM), over the whole surface of the fuel cell or electrolyser. This layer is hereafter referred to as "distribution layer".

A third layer, engaging closely the other side of the collector layer, is a layer, used to provide the contact between diffusion layer and PEM. At this so-called contact layer or "electrode layer", the electrochemical reaction takes place, due to the presence of catalytic elements, either on the contact layer or the PEM itself. Gasses, being provided via the diffusion layer to this contact layer, are to be retained sufficiently to enable the electrochemical reaction to take place.

The contact layer, and possibly also the diffusion layer, may be made hydrophobic (e.g. by impregnation or presence of hydrophobic elements such as Teflon®) or hydrophilic.

Depending on the place of the stack in the fuel cell or the electrolyser, a electrochemical reaction takes place in which e−, protons (H+) and a gas are consumed or provided near a PEM.

The H+ are provided or evacuated via the PEM to the electrochemical reaction. Therefore, the contact between contact layer and PEM is to be as perfect as possible, since the electrochemical reaction takes place at the catalytic layer, which is close to the surface of the PEM.

The e− are provided or evacuated via the stack of collector layer, diffusion layer and contact layer. Therefore, all layers engaged are to be electro-conductive, and the resistance over the stack, and especially the contact resistance at the contacts of the several layers is to be as low as possible.

The diffusion layer is to spread the gas flow as much as possible over the whole surface of the contact layer, in order to use the present catalytic elements as complete as possible, providing e− and H+ over the whole surface of the PEM.

An example of a stack is described in WO0069003 and EP0141241.

Further it is known that the mechanical connection of a sintered connection between a metal plate or foil and a metal mesh or expanded metal sheet or sheet of foamed metal, may be relatively weak. This weakness, resulting in a release between both materials, may lead to higher electrical contact resistance between both layers, since this resistance is determined by a strong and firm contact of both surfaces.

SUMMARY OF THE INVENTION

The present invention has as an object to provide an improved stack for use in fuel cells or electrolysers, which comprises a metal foil or metal plate, a metal mesh and/or an expanded metal sheet, and which has an improved mechanical contact between those two elements, which improved mechanical contact also provide improved electrical properties.

A stack as subject of the invention comprises at least two layers:
  At least one gas- and liquid impermeable metal structure (collector layer), such as a metal foil or metal plate;
  At least one metal layer (diffusion layer), comprising a metal mesh and/or an expanded metal sheet and/or a sheet of foamed metal;
  According to the invention, a layer comprising metal fibers is provided between the diffusion and collecting layer. This layer is hereafter referred to as "anchoring layer". The anchoring layer comprises metal fibers and is less than 0.5 mm thick.

The anchoring layer preferably is more than 0.05 mm thick. Preferably, the weight of the anchoring layer is less than 350 $g/m^2$, but more than 40 $g/m^2$, and the porosity of this anchoring layer is more than 60% but less than 98%.

A stack as subject of the invention may comprise
  a gas- and liquid impermeable metal structure (collector layer), such as a metal foil or metal plate;
  two metal layers (diffusion layers), comprising a metal mesh and/or an expanded metal sheet and/or a sheet of foamed metal; the first diffusion layer being present at one side of the collector layer, whereas the second diffusion layer being present at the other side of the collector layer.

It is understood that according to the invention, an anchoring layer comprising metal fibers is present between the diffusion and collecting layers. The collector layer, the anchoring layer and the diffusion layer are sintered to each other. The anchoring layers comprise metal fibers and are less than 0.5 mm thick, but preferably more than 0.05 mm. Preferably, the weight of the anchoring layers are less than 350 $g/m^2$, but more than 40 $g/m^2$, and the porosity of this anchoring layers are more than 60% but less than 98%.

In case the thickness is too large, the anchoring layer does not further improve the mechanical properties, in the mean time keeping the porosity of the mesh or expanded metal sufficiently high. The metal fibers of this anchoring layer start to penetrate the diffusion layer, which may decrease the air diffusing properties of this diffusion layer.

The equivalent diameter D of the metal fibers used to provide the anchoring layer or layers, is preferably larger than 2 μm, or even larger than 8 μm. Most preferably however, relatively thick fibers, having an equivalent diameter of more than 12 μm, or even more than 22 μm or 35 μm, are used. The average length L of the metal fibers used to provide the anchoring layer or layers may vary to a large extend. Preferably L/D is more than 5, most preferably more than 10 or even more than 20.

With "equivalent diameter of a metal fiber" is meant the diameter of an imaginary circle, which has the same surface as a cross-section of the metal fiber.

The diffusion layer may comprise one or more metal meshes or expanded metal sheets or sheets of foamed metal. Meshes is to be understood as woven, knitted or braided metal wires, combined into a sheet using known knitting, weaving or braiding techniques. Meshes are also to be understood as welded mesh. The wires, used to provide a metal mesh have preferably a diameter of 0.5 mm to 1 mm. The thickness of the mesh is preferably between 1 mm and 2 mm. Most preferably, an open mesh is used, having an open area larger than 30%. The open area of a mesh is calculated as:

Open area=$100 \times (W_{warp} \times W_{weft})/((W_{warp}+d_{warp}) \times (W_{weft}+d_{weft}))$ $W_{warp}$=the distance between two wires in warp direction (warp wires)
$W_{weft}$=the distance between two wires in weft direction (weft wires)
$d_{warp}$=the diameter of the warp wires
$d_{weft}$=the diameter of the weft wires Expanded metal sheets are to be understood as metal plate or foil, which is provided with a set of slots end which is expanded in one or more directions of the plane of the plate or foil. The thickness of the metal sheet is preferably less than 1.2 mm. The open area, being the ratio of open space of the expanded metal sheet sample, compared to the total surface of the expanded metal sheet sample, in perpendicular projection of such of the expanded metal sheet sample, is preferably more than 30%. The thickness of the expanded metal sheet (once expanded) is preferably between 0.8 mm and 2 mm.

A sheet of foamed metal is to be understood as an essentially flat sheet of foam, provided out of a metal alloy, having a porosity in the range of 85 to 98% and pore sizes in the range of 10 to 200 µm. the sheet of foamed metal preferably has a thickness in the range of 0.8 to 2 mm.

Such wire meshes or expanded metal sheets or sheets of foamed metal provide a sufficient porosity and a sufficient planar air permeability to the wire mesh or expanded sheet when used in the stack as subject of the invention.

Possibly, a second metal fiber layer (contact layer), comprising metal fibers is sintered to the diffusion layer or layers at the side of the diffusion layer or layers which is not connected to the anchoring layers.

In case a contact layer or layers are present, the porosity of the contact layers are less than 80% or even less than 75%.

The equivalent diameter of the metal fibers used to provide the second metal fibers layer, so-called contact layer, is smaller than 30 µm, most preferably smaller than 10 µm. Possibly, more than one sheet of metal fibers is used to provide the second metal fibers layer.

The thickness of the contact layer is preferably less than 0.2 mm.

Preferably, the perpendicular air permeability of the contact layer is less than 200 l/min*dm$^2$, most preferably even less than 150 l/min*dm$^2$. With perpendicular air permeability is meant the amount of gas which is passed through the metal fibers layer in a direction perpendicular to the plane of the layer, measured using an underpressure of 200 Pa, and measured using methods known in the art, such as a Textest FX3300. The perpendicular air permeability is expressed in l/min*dm$^2$.

The planar air permeability of the stack as subject of the invention, possible at both sides of the impermeable metal structure in case an anchoring layer, a diffusion layer and possibly a contact layer is present at both sides of the collecting layer, is preferably more than 0.02 l/min*cm, and most preferably more than 0:2 l/min*cm. A diffusion layer as used to provide a stack as subject of the invention provides to the largest extend the planar air permeability to the stack, and hence a superior distribution of the reaction gas over the whole surface of the stack.

With planar air permeability is meant the amount of gas which is passed through the metal fibers layers of the stack in a direction parallel to the plane of the layers. This planar air permeability is measured by taking a rectangular part of the stack, having a height of 2.5 cm. This side is hereafter referred to as short side. The other side of the rectangular sample is referred to as long side. This rectangle is clamped between two seals of equal dimension, in such a way that the sides of the sample and the sides of the seals coincide. Air is sucked using an underpressure of 200 Pa at the long side of the rectangular sample over a length of 5 cm. The non-used length of the long side via which is sucked is sealed. The volume of air sucked is measured, and the permeability is expressed in l/min*cm, for which dm is the unity of length of the sample. Preferably, a length of 5 cm of the long side is used.

The properties of the stack as subject of the invention are further improved by the presence of such a contact layer. In case such contact layers are present, the contact layers, obtaining reaction gas via the diffusion layer over its whole surface, retains the gas sufficiently to propagate the electrochemical reaction at its reactive side, being the side of the contact layer, which contacts the adjacent PEM. Since the perpendicular air permeability of the second metal fiber layer is relatively low, a too quick consumption of reaction gas at the gas entrance of the stack is prevented, which results in a presence of reactive gas over the whole surface of the connection layer. Possibly, the side of the contact layer, which contacts the PEM, is provided with an appropriate catalyst. Alternatively the catalyst is present on the surface of the PEM. Due to the small equivalent diameter of the metal fibers used to provide the contact layer, and the density of this layer, a very high degree of contact between contact layer and PEM may be obtained, whereas the side of the layer contacting the PEM, is relatively soft. Metal fibers projecting out of the essentially flat surface of the contact layer, will not penetrate through the PEM when used, but will bend to the contact layer surface during assembly and use of the fuel cell or electrolyser.

The "porosity" of the diffusion and anchoring and possibly the contact layer or layers is expressed as Porosity=100−Density.

With "density" is meant 100 times the ratio of the weight per volume of the layer over the weight of an identical volume which exists for 100% of the metal alloy of which the metal fibers are provided. The density is expressed in percentage.

Preferably the impermeable metal structure is a metal foil or metal plate, most preferably provided out of stainless steel, Ni, Ni-alloys, e.g. Inconel®. or Ti. In case of stainless steel, preferably Fe—Ni—Cr alloys are used such as alloys of the series AISI-300, preferably AISI 316L or Fe—Cr alloys such as alloys of the series AISI-400.

Preferably the metal meshes and/or expanded metal sheets and/or sheets of foamed metal are provided out of stainless steel, Ni, Ni-alloys, e.g. Inconel®. or Ti. In case of stainless steel, preferably Fe—Ni—Cr alloys are used such as alloys of the series AISI-300, preferably AISI 316L or Fe—Cr alloys such as alloys of the series AISI-400. The metal fibers, used to provide the anchoring layer or layers, and possibly the contact layer or layers, are preferably stainless steel fibers, Ni— or Ni alloy fibers or Ti-fibers. In case of stainless steel fibers, preferably Fe—Ni—Cr alloys are used such as alloys of the series AISI-300, preferably AISI 316L or Fe—Cr alloys such as alloys of the series AISI-400. The metal fibers may be obtained by using presently known techniques, such as bundle drawing, coil shaving or any other production technique.

Preferably all layers of the stack are provided out of the same metal or metal alloy.

The diffusion layers, the collecting layer and the anchoring layer or layers, may be sintered to each other all at once during one sintering operation. Alternatively several sintering operations may be executed in order to obtain a stack as subject of the invention. Most preferably, the anchoring layer has not been sintered when it is provided between the collecting layer and he diffusion layer. In case also a contact layer or layers are provided to the stack, these contact layers may be sintered separately or may be provided unsintered to the stack before the layers are sintered to each other.

The stack as subject of the invention has in improved mechanical binding between the diffusion layer and the collector layer, due to the presence of the anchoring layer. Since the dimensions (thickness, weight and porosity) of this anchoring layer are kept to a minimum, the weight of the stack is not increases needlessly, but the mechanical consistence is improved over time. Due to this improved mechanical binding, the electrical resistance measured over the layers of the stack, is kept to a minimum. The resistance is even lowered as compared to identical stacks, not comprising such anchoring layer.

A stack as subject of the invention has a transversal electrical resistance which is less than a stack, comprising similar layers, which is not sintered, or a sintered stack, which does not comprise the anchoring layer. With transversal resistance is meant the electrical resistance measured between a point on the surface of the impermeable metal structure and the point of the side of the connecting layer to be used against the PEM, which point is closest to the point of the impermeable metal structure. This low resistance is obtained thanks to the many contact points between several fibers being sintered to each other or to the collector layer.

After sintering, possibly, but not necessarily, the layers may be impregnated with a hydrophobic or hydrophilic agent, e.g. polytertrafluoethylene such as Teflon® as hydrophobic agent.

Such stacks may be used in a fuel cell, where at least two stacks as subject of the invention are used. Between a contact layer of the first stack and a contact layer of a second stack, a PEM is provided. At both sides of the PEM, necessary catalysts are present to propagate the electrochemical reaction wanted. To the diffusion layer of the first stack, $H_2$ is provided, which flows through the whole diffusion layer (due to the relatively high planar air permeability of the stack). At the PEM, a reaction as underneath is propagated:

$$H_2 \rightarrow 2H^+ + 2e^-$$

This side of the fuel cell is referred to as anode. $H^+$ is conducted through the PEM to the opposite side of the PEM, whereas the $e^-$ is drained away through the electrically conductive connection and diffusion layer to the impermeable metal structure.

The e– is guided via an electrical circuit to the other impermeable metal structure of the second stack. Again via the diffusion and connection layer of this second stack, the $e^-$ are provided to the electrochemical reaction at this side of the PEM, being the cathode side. $O_2$ is provided to the diffusion layer of this second stack, which is conducted through the connection layer to the surface of the PEM. Here a reaction takes place, using $O_2$, $e^-$ and $H^+$ (provided through the PEM):

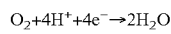

Since the optimal planar air permeability of the stack, and the relatively low perpendicular air permeability of the connection layers, the gasses are spread in an optimal way over the whole PEM surface. Further, since the low electrical transversal resistance of the stacks, the e⁻ are conducted to the electrical circuit without a significant loss of power.

A similar benefit is made when the stacks are used in electrolysers. An identical combination of at least two stacks is provided. A determined electrical tension is provided between the two impermeable metal structures. At the stack with a positive electrical tension on its impermeable metal structure, $H_2O$ is provided, which reacts at the PEM surface as:

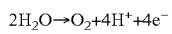

The $H^+$ is conducted through the PEM to the other side of the PEM, whereas the e⁻ is conducted via the metal fiber layers to the impermeable metal structure. $O_2$ is easily evacuated since the high planar air permeability of the diffusion layer.

At the other side, a reaction takes place:

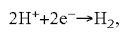

Where $H^+$ is provided via the PEM and the e– are provided via the impermeable metal structure (being negative pole) and the metal fiber layers. $H_2$ is easily evacuated due to the high planar air permeability of the diffusion layer.

BRIEF DESCRIPTION OF THE DRAWINGS

The invention will now be described into more detail with reference to the accompanying drawings wherein FIG. 1a, FIG. 1b and FIG. 1c show schematically a stack as subject of the invention;

FIG. 2 shows schematically an alternative stack as subject of the invention;

FIG. 3 shows schematically an alternative stack as subject of the invention;

FIG. 4 shows a detail of the connection between mesh or expanded metal sheet and metal plate or foil via metal fiber layer;

FIG. 5a, FIG. 5b and FIG. 5c show schematically a test set up to measure the planar air permeability of a stack;

FIG. 6 shows schematically a fuel cell as subject of the invention;

FIG. 7 shows schematically an electrolyser as subject of the invention.

DESCRIPTION OF THE PREFERRED EMBODIMENTS OF THE INVENTION

Figure 5A:
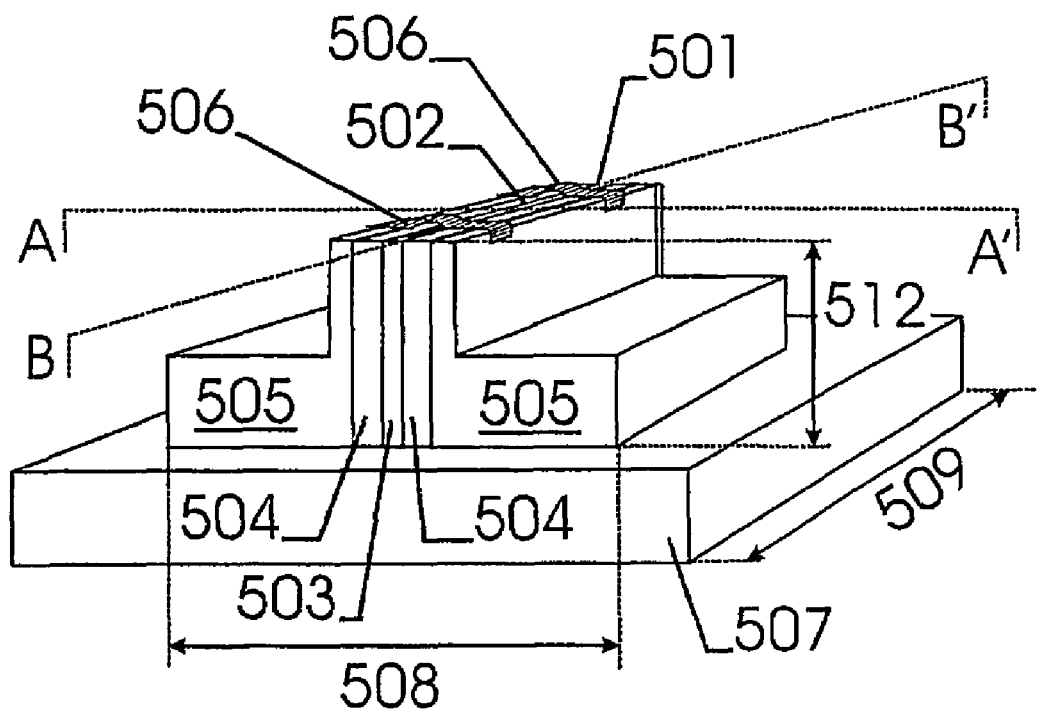

An embodiment of a porous stack as subject of the invention is shown in FIGS. 1a, 1b and 1c.

The stack 10 comprises a gas- and liquid impermeable metal structure, so-called collector layer 11. In the embodiment shown in FIGS. 1a, 1b and 1c, a metal plate provided out of stainless steel with alloy AISI 316L is used. The collector layer has a thickness of 0,4 mm.

To one side of the collector layer 11, a metal mesh 12a is sintered (FIG. 1a). The mesh, preferably a woven metal wire mesh, comprises metal wire of diameter 0.63 mm. Such woven mesh has a thickness of 1.26 mm and an open area of 44%, Alternatively, as show in FIG. 1b, an expanded metal sheet 12b is sintered to the collector layer. The metal sheet was provided with a multitude of slits. Before stretching, the metal sheet had a thickness of 0.6 mm. After stretching (in order to

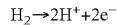

provide an expanded metal sheet), the slits are changed into openings. The expanded metal sheet has a thickness of 0.95 mm and an open area of 54% after expansion.

Alternatively, as show in FIG. 1c, a sheet of foamed metal 12c is sintered to the collector layer. The sheet of foamed metal has a thickness of 1 mm, a porosity of 90% and an average pore size in the range of 10 to 200 μm.

Between the collector layer 11 and the wire mesh 12a or expanded metal sheet 12b, hereafter referred to as diffusion layer, and as subject of the invention, a fine layer of metal fibers is provided.

This layer, hereafter referred to as anchoring layer, comprises metal fibers which preferably but not necessarily are bundle drawn and which have an equivalent diameter of 22 mm. The layer has a thickness of 0.4 mm, a weight of 300 g/m.sup.2 and a porosity of 87%.

Alternatively, an anchoring layer comprising metal fibers having an equivalent diameter of 22 μm, having a thickness of 0.1 mm, a weight of 50 $g/m^2$ and a porosity of 90% may be used as well.

Additional layers may be provided to the stack as subject of the invention, as shown in FIG. 2. The stack 20 comprises a collector layer 21, a diffusion layer 22 and an anchoring layer 23, which are identical to the corresponding layer of FIG. 1a or FIG. 1b.

To the side of the diffusion layer, which does not contact the collector layer, a second metal fiber layer 24, being the contact layer, is provided.

This contact layer 24 consists of sintered bundle drawn stainless steel fibers (Alloy AISI 136L) having an essentially circular cross-section with an equivalent diameter of 8 μm. This contact layer 24 has a thickness of approximately 0,2 mm and a porosity of preferably 70%.

An alternative stack 30 as subject of the invention is shown in FIG. 3. This embodiment comprises a collector layer 31, being identical to the collector layer of FIG. 1.

At both sides 35a and 35b of the collector layer 31, a diffusion layer 32a and 32b is provided, each diffusion layer 32a and 32b being identical as the diffusion layer of FIG. 2.

According to the present invention, between the collector layer 31 and the diffusion layers 32a and 32b, an anchoring layer 33a and 33b is provided, similar to the anchoring layer 23 of FIG. 2.

Similar as in FIG. 2, a contact layer 34a and 34b is provided to the sides of diffusion layer 32a and 32b. These contact layers 34a and 34b are identical as the contact layer of FIG. 2.

As shown in FIG. 4, the contact and connection between layer 11 and mesh or stretch metal 12 is improved by the presence of the fiber layer 13.

The fibers 41 of fiber layer 13 are sintered at one side to the collector layer 11 or to other fibers 41; at another side several fibers are sintered to the mesh or stretch metal 12. The number of connecting points between mesh or stretch metal 12 and collector layer 11 is drastically increased, which has two advantages: the mechanical connection between both layer is improved and due to the metal nature of the fibers, the electrical resistance over the connection of mesh or stretch metal and collector layer is decreased.

Figure 5B:
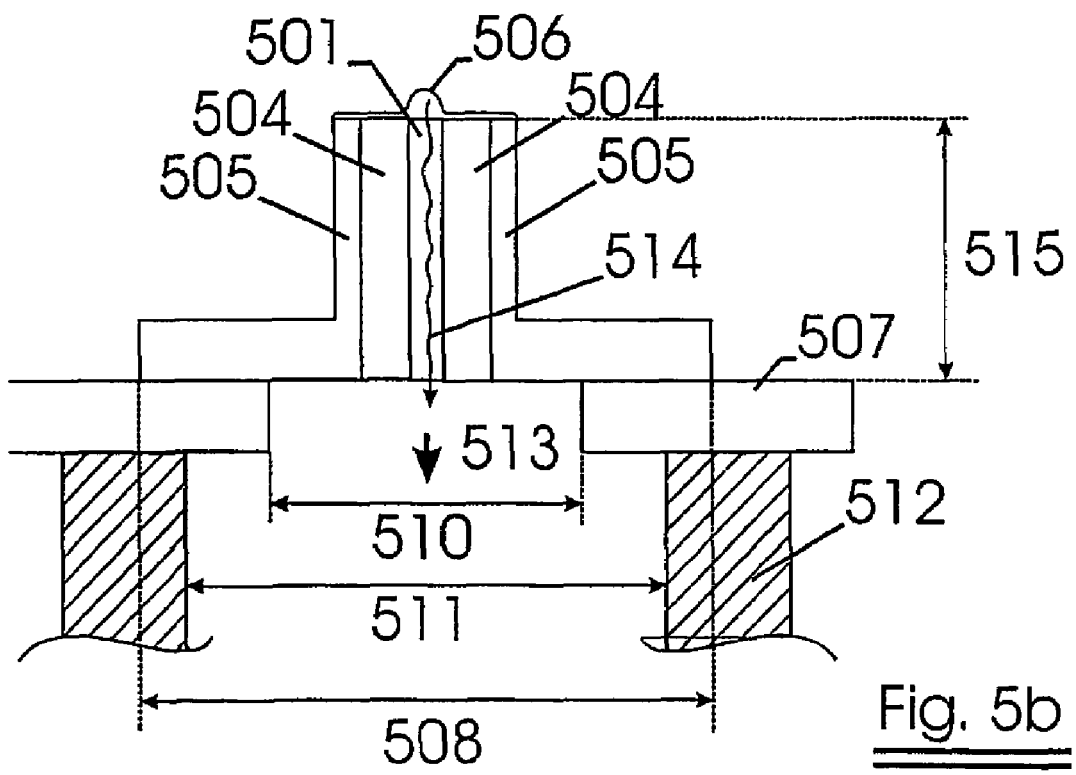

The planar air permeability of stack 20, and of both sides 35a and 35b of stack 30, are measured as shown in FIGS. 5a to 5c.

As shown in FIG. 5a, a rectangular sample (501) of a stack, having a long side 502 and a short side 503 is clamped between two seals 504 by means of two clamps 505. The sealant material of seal 504 is preferably a HD PE-foam, having a thickness of approximately 10 mm when not pressed. The clamps 505 are preferably made out of metal. All parts are kept together by closing means 506, e.g. a clip. This assembly is placed on a sealant 507, which is provided with a hole having a diameter 510 (see FIGS. 5b and 5c), located underneath the long side 502. The dimension 508 and 509 of the assembly is at least 2 cm larger than the diameter 510 of the hole. The height 515 of the short side 503 is taken 2.5 cm. In a section according to AA' in FIG. 5b, and in the section according to BB' in FIG. 5c, it is shown that the assembly is placed over the opening of a sucking device 512, e.g. a Textest FX3300, having a suction opening with a diameter 511, which is at least equal to the diameter of the opening in the sealant 507, but which is smaller than the dimension 508 and 509. Air is sucked in direction 513 using an underpressure of 200 Pa through the sample 501 of the stack, as indicated with arrow 514. The volume of air sucked is measured per minute, and the air permeability is expressed as the volume per minute and per length unit of the diameter of opening 510.

The planar air permeability of stack 20 and of both sides 35a and 35b of stack 30 are 0.7 l/min*cm.

It was found that the porosity of contact layer 23, 34a or 34b does not make significant changes to this planar air permeability.

The perpendicular air permeability of the contact layer 24, 34a and 34b is measured to be 123 $l/min*dm^2$ for a contact layer of 70% porosity.

The stacks 20 or 30 as subject of the invention may be used in an electrolyser or in a fuel cell, as shown in FIG. 6 and FIG. 7.

FIG. 6 shows a fuel cell 60, comprising several stacks 20 and 30, separated from each other using proton exchange membranes 61, between the contact layers of the stacks 20 or 30 and the PEM 61, appropriate catalysts are provided.

$O_2$ or $H_2$ is provided to the stack in such a way that at both sides of the PEM, an electrochemical reaction takes place. The $e^-$ are collected through the contact and diffusion layers by the collector layers.

The collector layers are connected to each other via an appropriate electrical connection device 62, which provided electrical current to be used by an electrical device or to a battery 63.

In FIG. 7, two stacks 20 are separated from each other by means of a catalytically coated PEM 71.

An electrical tension is provided by a tension source 72 to the collector layers of the electrolyser. $H_2O$ being provided to the electrolyser, reacts electrochemically, providing $O_2$ and $H_2$.

The invention claimed is:

1. A stack, to be used in a fuel cell or electrolyzer, comprising:
    a collector layer, said collector layer being a metal foil or metal plate,
    at least one anchoring layer, said anchoring layer comprising metal fibers, said anchoring layer having a thickness of less than 0.5 mm,
    at least one diffusion layer, said diffusion layer being a metal mesh or expanded metal sheet or a sheet of foamed metal,
    wherein said anchoring layer is provided between said collector layer and said diffusion layer,
    wherein said collector layer, anchoring layer and diffusion layer are sintered to each other, and
    at least one contact layer sintered to a side of said diffusion layer which is not connected to said anchoring layer,
    wherein said contact layer comprises metal fibers,
    wherein the at least one diffusion layer is a metal mesh, wherein the metal mesh comprises woven, knitted, or braided metal wires.

2. A stack, to be used in a fuel cell or electrolyzer as in claim 1, comprising two diffusion layers and two anchoring layers, wherein a first of said diffusion layers is present at one side of said collector layer, wherein a second of said diffusion layers is present at another side of said collector layer, said anchoring layers being present between said collector layer and said first and second diffusion layers.

3. A stack, to be used in a fuel cell or electrolyzer as in claim 1, said anchoring layer having a weight of less than 350 g/m$^2$.

4. A stack, to be used in a fuel cell or electrolyzer as in claim 1, said anchoring layer having a porosity of more than 60%, said porosity being less than 98%.

5. A stack, to be used in a fuel cell or electrolyzer as in claim 1, said diffusion layer having an open area of more than 30%.

6. A stack, to be used in a fuel cell or electrolyzer as in claim 1, said diffusion layer having a thickness of more than 1 mm.

7. A stack, to be used in a fuel cell or electrolyzer as in claim 1, said metal mesh comprising metal wires having a diameter of more than 0.5 mm.

8. A stack, to be used in a fuel cell or electrolyzer as in claim 1, said diffusion layer comprising an expanded metal sheet, said expanded metal sheet having a thickness of less than 1.2 mm.

9. A stack, to be used in a fuel cell or electrolyzer as in claim 1, said metal fibers of said anchoring layer having an equivalent diameter of more than 2 μm.

10. A stack, to be used in a fuel cell or electrolyzer as in claim 1, said metal fibers of said contact layer having an equivalent diameter of less than 30 μm.

11. A stack, to be used in a fuel cell or electrolyzer as in claim 1, said contact layer having a thickness of less than 0.2 mm.

12. A stack, to be used in a fuel cell or electrolyzer as in claim 1, said contact layer having a perpendicular air permeability of less than 200 l/min*dm$^2$.

13. A stack, to be used in a fuel cell or electrolyzer as in claim 1, said stack having a planar air permeability of more than 0.02 l/min*cm.

14. A stack, to be used in a fuel cell or electrolyzer as in claim 1, said metal fibers of said anchoring layer being stainless steel fibers.

15. A stack, to be used in a fuel cell or electrolyzer as in claim 1, said metal fibers of said anchoring layer being Ni-fibers or Ni-alloy fibers.

16. A stack, to be used in a fuel cell or electrolyzer as in claim 1, said metal fibers of said anchoring layer being Ti-fibers.

17. A stack, to be used in a fuel cell or electrolyzer as in claim 1, said collector layer, said diffusion layer and said anchoring layer being provided out of the same metal or metal alloy.

18. A stack, to be used in a fuel cell or electrolyzer as in claim 1, wherein all of said layers comprise the same metal or metal alloy.

19. A fuel cell, comprising at least one stack as in claim 1.

20. An electrolyzer, comprising at least one stack as in claim 1.

21. A stack, to be used in a fuel cell or electrolyzer as in claim 1, wherein the wires have a diameter of 0.5 mm to 1 mm.

* * * * *

UNITED STATES PATENT AND TRADEMARK OFFICE
CERTIFICATE OF CORRECTION

| | | |
|---|---|---|
| PATENT NO. | : 7,585,583 B2 | Page 1 of 1 |
| APPLICATION NO. | : 10/501146 | |
| DATED | : September 8, 2009 | |
| INVENTOR(S) | : Losfeld et al. | |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 918 days.

Delete the phrase "by 918 days" and insert -- by 1454 days --

Signed and Sealed this

Twentieth Day of April, 2010

David J. Kappos
*Director of the United States Patent and Trademark Office*